(12) United States Patent
Ochiai et al.

(10) Patent No.: US 10,293,657 B2
(45) Date of Patent: May 21, 2019

(54) VEHICLE AUTOMATIC DEFROST SYSTEM AND METHOD

(71) Applicant: Toyota Motor Engineering & Manufacturing North America, Inc., Erlanger, KY (US)

(72) Inventors: Yuichi Ochiai, Cupertino, CA (US); Katsumi Nagata, Foster City, CA (US); Akira Sasaki, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 610 days.

(21) Appl. No.: 15/053,990

(22) Filed: Feb. 25, 2016

(65) Prior Publication Data
US 2017/0246930 A1    Aug. 31, 2017

(51) Int. Cl.
*B60H 1/00*    (2006.01)

(52) U.S. Cl.
CPC ..... *B60H 1/00785* (2013.01); *B60H 1/00849* (2013.01); *B60H 1/00792* (2013.01); *B60H 1/00807* (2013.01); *G05B 2219/2614* (2013.01)

(58) Field of Classification Search
CPC ............ B60H 1/00785; B60H 1/00849; B60H 1/00792; B60H 1/00807
USPC ................................... 700/276; 165/224, 42
See application file for complete search history.

(56) References Cited

U.S. PATENT DOCUMENTS

| | | | |
|---|---|---|---|
| 4,424,933 A * | 1/1984 | Sutoh | G05D 22/02 165/224 |
| 5,072,597 A | 12/1991 | Bromley et al. | |
| 5,971,066 A * | 10/1999 | Oehring | B60H 1/00785 165/202 |
| 6,112,807 A | 9/2000 | Dage | |
| 6,155,061 A | 12/2000 | Davis, Jr. et al. | |
| 6,508,408 B2 | 1/2003 | Kelly et al. | |
| 6,625,995 B2 | 9/2003 | Remond et al. | |
| 6,668,917 B1 | 12/2003 | Zeng | |
| 7,102,501 B2 | 9/2006 | Lo Presti et al. | |
| 7,337,622 B2 | 3/2008 | Wang et al. | |

(Continued)

FOREIGN PATENT DOCUMENTS

CN    102991440    3/2013
EP    2248692    11/2010

*Primary Examiner* — Vu A Le
(74) *Attorney, Agent, or Firm* — Snell & Wilmer LLP

(57) ABSTRACT

A system includes an external temperature sensor, an internal temperature sensor and an internal moisture sensor, along with an HVAC for blowing air into the vehicle. The system also includes an electronic control unit (ECU) coupled to the sensors and the HVAC. The ECU determines a difference between the inside air temperature and the ambient air temperature and sets a condensation indicator when the ambient air temperature is less than a first temperature threshold, the difference between the inside air temperature and the ambient air temperature is greater than a second temperature threshold, and the inside moisture level is greater than a moisture threshold. The ECU determines a condensation temperature at which additional condensation will accumulate on the window, determines the desired temperature for the air blown by the HVAC and controls the HVAC to blow air at the desired temperature when the condensation indicator is set.

20 Claims, 6 Drawing Sheets

(56) References Cited

U.S. PATENT DOCUMENTS

| | | |
|---|---|---|
| 7,461,551 B2 | 12/2008 | Kataoka et al. |
| 8,312,918 B2 | 11/2012 | Burns et al. |
| 8,733,428 B2 | 5/2014 | Nakajima |
| 9,045,043 B2 | 6/2015 | Hoke et al. |
| 2006/0004494 A1 | 1/2006 | Errington |
| 2007/0194735 A1* | 8/2007 | Gao ................... B60H 1/00642 318/443 |

* cited by examiner

| | |
|---|---|
| MOISTURE THRESHOLD | 35% |
| 1ST TEMPERATURE THRESHOLD | 65 DEGREES F |
| 2ND TEMPERATURE THRESHOLD | 10 DEGREES F |

602

| AMBIENT AIR TEMPERATURE | INSIDE AIR TEMPERATURE | DIFFERENCE | INSIDE MOISTURE LEVEL | AMBIENT MOISTURE LEVEL | CONDENSATION INDICATOR | DESIRED TEMPERATURE | RECYCLED AIR? |
|---|---|---|---|---|---|---|---|
| 70 | 75 | 5 | 40% | 35% | NO | | |
| 50 | 55 | 5 | 40% | 35% | NO | | |
| 50 | 65 | 15 | 40% | 35% | YES | 60 | NO |
| 20 | 60 | 40 | 40% | 35% | YES | 45 | NO |
| 20 | 30 | 10 | 40% | 35% | YES | 40 | NO |
| 50 | 65 | 15 | 40% | 50% | YES | 60 | YES |

VEHICLE AUTOMATIC DEFROST SYSTEM AND METHOD

BACKGROUND

Field

The present disclosure relates to systems and methods for automatic defrost of vehicle windows and, more particularly, for determining whether condensation is likely to form on the windows of a vehicle and automatically controlling an HVAC to properly reduce the condensation.

Description of the Related Art

Many vehicles include climate controls for controlling operation of a heating, ventilation and air conditioning system (HVAC). One control available to the user is a defrost setting for reducing condensation on an internal surface of a window. These defrost settings are typically controlled manually. Thus, in order to defrost a window, a driver must be aware that condensation is likely to occur or is present on the window, must know the correct settings for the HVAC to remove the condensation and must manually control the HVAC to operate at the correct settings.

The correct settings of the HVAC for condensation removal are difficult to determine and vary based on factors such as an air temperature in the cabin of the vehicle, an air temperature outside of the cabin and a moisture level in the cabin. All this information is generally not available to the person trying to control the settings. If the optimal settings are not selected, the condensation may not dissipate sufficiently fast or the amount of condensation on the windows may increase.

Many drivers are not aware of the fact that optimal settings exist for reducing the amount of condensation. These drivers may thus turn on a defrost setting of the HVAC without changing any other settings. This can cause unnecessary delay in condensation removal or additional accumulation of condensation. Thus, the driver may have to wait for a relatively long period of time before driving or may even attempt to drive unsafely without reducing or removing the condensation beforehand.

Thus, there is a need for systems and methods for automatic defrost control for vehicles.

SUMMARY

Described herein is a system for reducing condensation of an internal surface of a window of a vehicle. The system includes an external temperature sensor for detecting an ambient air temperature of an environment of the vehicle, an internal temperature sensor for detecting an inside air temperature of a cabin of the vehicle and an internal moisture sensor for detecting an inside moisture level of the air inside of the cabin of the vehicle. The system also includes a heating, ventilation and air conditioning system (HVAC) that can blow air into the cabin of the vehicle (e.g., towards the internal surface of the window of the vehicle) at a desired temperature and humidity. The system also includes an electronic control unit (ECU) coupled to the external temperature sensor, the internal temperature sensor, the internal moisture sensor and the HVAC. The ECU can determine a difference between the inside air temperature and the ambient air temperature. The ECU can also set a condensation indicator when the ambient air temperature is less than a first temperature threshold, the difference between the inside air temperature and the ambient air temperature is greater than a second temperature threshold, and the inside moisture level is greater than a moisture threshold. The ECU can also determine a condensation temperature corresponding to a potential temperature of air from the HVAC at which additional condensation will accumulate on the window based on the inside air temperature and the ambient air temperature. The ECU can also determine the desired temperature for the air blown by the HVAC that is warmer than the ambient air temperature and cooler than the condensation temperature based on the inside air temperature and the ambient air temperature. The ECU can also control the HVAC to blow air at the desired temperature and humidity when the condensation indicator is set.

Also described is a method for reducing condensation of an internal surface of a window of a vehicle. The method includes detecting, using an external temperature sensor, an ambient air temperature of an environment (e.g., an outside air) of the vehicle. The method also includes detecting, using an internal temperature sensor, an inside air temperature of a cabin of the vehicle. The method also includes detecting, using an internal moisture sensor, an inside moisture level of the air inside of the cabin of the vehicle. The method also includes determining, by an electronic control unit (ECU), a difference between the inside air temperature and the ambient air temperature. The method also includes setting, by the ECU, a condensation indicator when the ambient air temperature is less than a first temperature threshold, the difference between the inside air temperature and the ambient air temperature is greater than a second temperature threshold, and the inside moisture level is greater than a moisture threshold. The method also includes determining, by the ECU, a condensation temperature corresponding to a potential temperature of air blown by a heating, ventilation and air conditioning system (HVAC) of the vehicle at which additional condensation will accumulate on the window based on the inside air temperature and the ambient air temperature. The method also includes determining, by the ECU, a desired temperature of air for the HVAC to blow that is warmer than the ambient air temperature and cooler than the condensation temperature based on the inside air temperature and the ambient air temperature. The method also includes controlling, by the ECU, the HVAC to blow air at the desired temperature when the condensation indicator is set.

Also described is a system for reducing condensation of an internal surface of a windshield of a vehicle having a longitudinal axis. The system includes a heating, ventilation and air conditioning system (HVAC) having a vent positioned on or adjacent to a dashboard of the vehicle and a blower configured to blow air through the vent into a cabin of the vehicle at a desired temperature. The system also includes an external temperature sensor configured to detect an ambient air temperature of an environment of the vehicle. The system also includes an internal temperature sensor positioned on or adjacent to the dashboard between a lower edge of the windshield and the vent and configured to detect an inside air temperature of the cabin of the vehicle. The system also includes an internal moisture sensor positioned on or adjacent to the dashboard and configured to detect an inside moisture level of the air inside of the cabin of the vehicle. The system also includes an external moisture sensor configured to detect an ambient moisture level of the air of the environment of the vehicle. The system also includes an electronic control unit (ECU) coupled to the external temperature sensor, the internal temperature sensor, the internal moisture sensor and the HVAC. The ECU can determine a difference between the inside air temperature and the ambient air temperature. The ECU can also set a condensation indicator when the ambient air temperature is less than a first temperature threshold, the difference between the inside air temperature and the ambient air temperature is greater than a second temperature threshold, and at least one of the inside moisture level is greater than a first moisture threshold or the ambient moisture level is greater than a second moisture threshold. The ECU can also determine a condensation temperature corresponding to a potential temperature of air from the HVAC at which additional condensation will accumulate on the windshield based on the inside air temperature and the ambient air temperature. The ECU can also determine the desired temperature for the air blown by the HVAC that is warmer than the ambient air temperature and cooler than the condensation temperature based on the inside air temperature and the ambient air temperature. The ECU can also determine that the air blown by the HVAC should be air conditioned to remove the excess condensation in the air. The ECU can also determine that the air blown by the HVAC should be recycled air (i.e., inside air) when the ambient moisture level is greater than the inside moisture level and fresh air (i.e., outside air) when the ambient moisture level is less than the inside moisture level. The ECU can also control the HVAC to blow air at the desired temperature when the condensation indicator is set.

BRIEF DESCRIPTION OF THE DRAWINGS

The features, obstacles, and advantages of the present invention will become more apparent from the detailed description set forth below when taken in conjunction with the drawings, wherein:

FIG. 6 is a chart illustrating various data detected by sensors of a vehicle and optimal settings of an HVAC for reducing condensation on a vehicle's window based on the detected data according to an embodiment of the present invention.

DETAILED DESCRIPTION

Described herein are systems and methods for automatic control of a vehicle's heating, ventilation and air conditioning system (HVAC) for reducing condensation on a vehicle's windows. The systems and methods provide several benefits and advantages such as automatically determining whether condensation is likely to form based on data detected by various sensors. The systems and methods also automatically active and adjust the settings of the HVAC to blow air with the proper air temperature and humidity level to prevent, reduce and/or remove condensation from forming or that has formed on the vehicle's windows. This provides benefits and advantages such as allowing drivers to focus on other pre-driving or driving tasks instead of adjusting or controlling the HVAC. The systems and methods provide further benefits and advantages such as determining the optimal settings of the HVAC for reducing or removing the condensation on the vehicle windows. This provides benefits and advantages such as reducing the likelihood of the condensation increasing and causing the condensation to be reduced at a relatively fast rate.

An exemplary system includes an HVAC that has at least one vent blowing air towards at least one window. The system also includes a temperature sensor for detecting an ambient air temperature, another temperature sensor for detecting an air temperature inside of a cabin of the vehicle, a moisture sensor for detecting a moisture level inside of the cabin and optionally another moisture sensor for detecting an ambient moisture level. The system also includes an electronic control unit (ECU). The ECU receives the detected air temperatures and moisture levels and determines whether condensation is likely to form on the at least one window based on the detected data. The ECU also determines optimal settings for relatively fast reduction or removal of condensation on the at least one window based on the detected data. The ECU also controls the HVAC to operate at the optimal settings.

Figure 1:
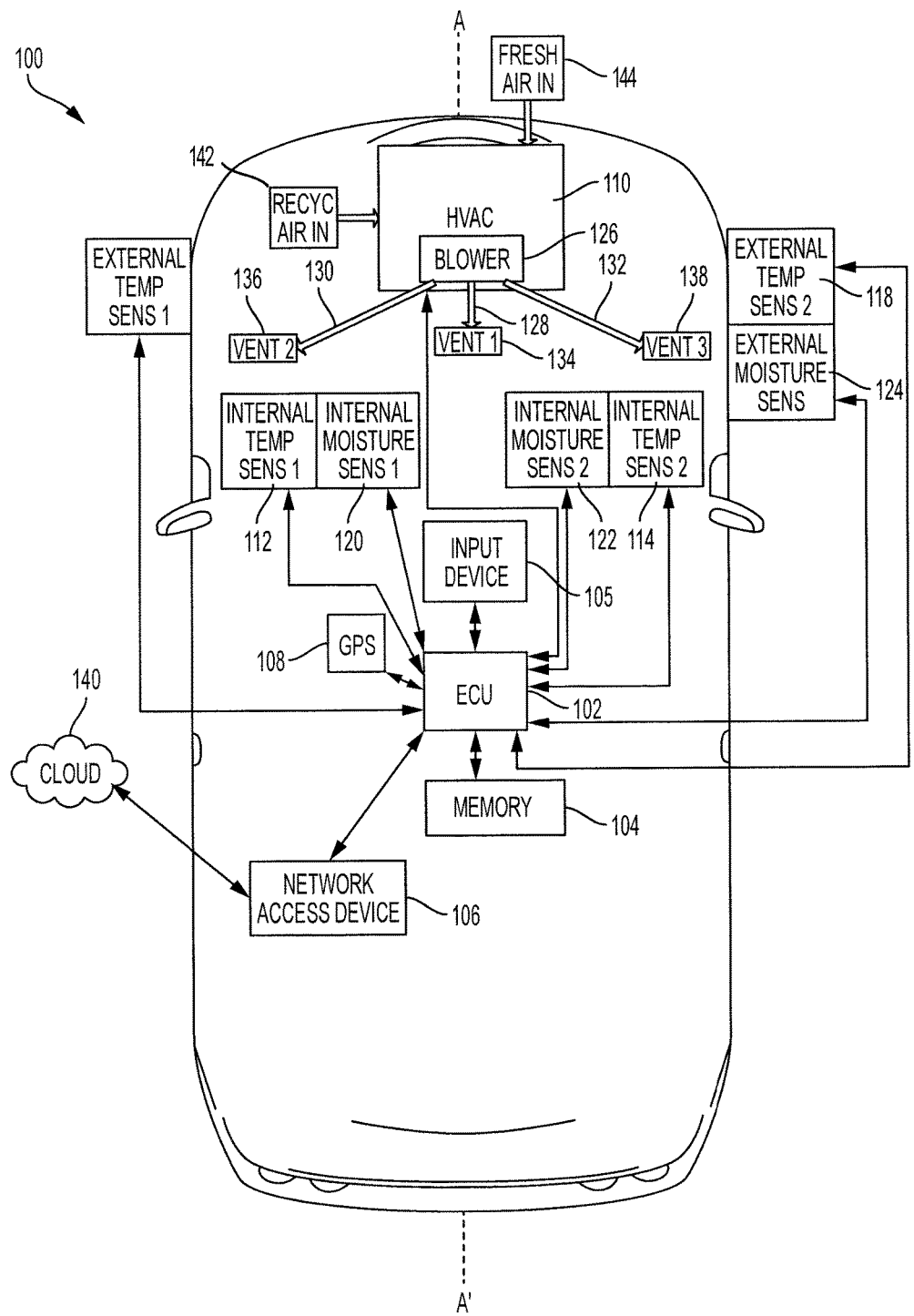
FIG. 1 is a block diagram of a vehicle capable of determining whether condensation is likely to occur on windows of the vehicle, determining settings of a heating, ventilation and air conditioning system (HVAC) for reducing the condensation and controlling the HVAC to operate at the determined settings according to an embodiment of the present invention.

Turning to FIG. 1, a vehicle 100 capable of automatic window defrosting may include an ECU 102, a memory 104, an input device 105, a network access device 106 and a GPS unit 108. The vehicle may also include an HVAC 110 and a plurality of sensors including a first internal temperature sensor 112, a second internal temperature sensor 114, a first external temperature sensor 116, a second external temperature sensor 118, a first internal moisture sensor 120, a second internal moisture sensor 122 and an external moisture sensor 124.

The ECU 102 can include one or more processors or controllers which are specifically designed for automotive systems. The functions of the ECU 102 can be implemented in a single ECU or in multiple ECUs. The ECU 102 may receive data from components of the vehicle 100, may make determinations based on the received data and may control the operations of components based on the determinations and received data.

The memory 104 may include any non-transitory memory known in the art. In that regard, the memory 104 may store machine-readable instructions usable by the ECU 102 and may store any other data as requested by the ECU 102.

The input device 105 may include any input device capable of receiving user input. For example, the input device 105 may include a button, a knob, a dial, a touchscreen, a touchpad, a microphone or the like. The input device 105 may be coupled to the ECU 102 such that the ECU 102 can receive user input from the input device 105. The input device 105 may receive user input indicating whether the user would like for an automatic defrost function of the vehicle 100 to be turned on or off.

The network access device 106 may include any device capable of communicating with an external device or network. For example, the network access device 106 may communicate with the cloud 140 via 3G protocols, 4G protocols, 802.11 (Wi-Fi) protocols, a Dedicated Short-Range Communications (DSRC, usable in vehicle-to-infrastructure or vehicle-to-vehicle communications) port or the like.

In some embodiments, the network access device 106 may also or instead include an input/output (I/O) port. In that regard, the network access device 106 may connect to other devices via a wired or wireless interface. For example, the network access device 106 may be a USB port, a Wi-Fi port, a Bluetooth port, a DSRC port or the like. The network access device 106 may transmit data to and receive data from an external device such as a mobile device (not shown), a telematics device (not shown) or the like. In that regard, the ECU 102 can communicate with the external device via the network access device 106.

The GPS unit 108 may include one or more GPS receivers and/or transmitters capable of receiving and/or transmitting location data corresponding to a current location of the vehicle 100. In that regard, the ECU 102 can determine a current location of the vehicle 100 based on data from the GPS unit 108.

Figure 2:
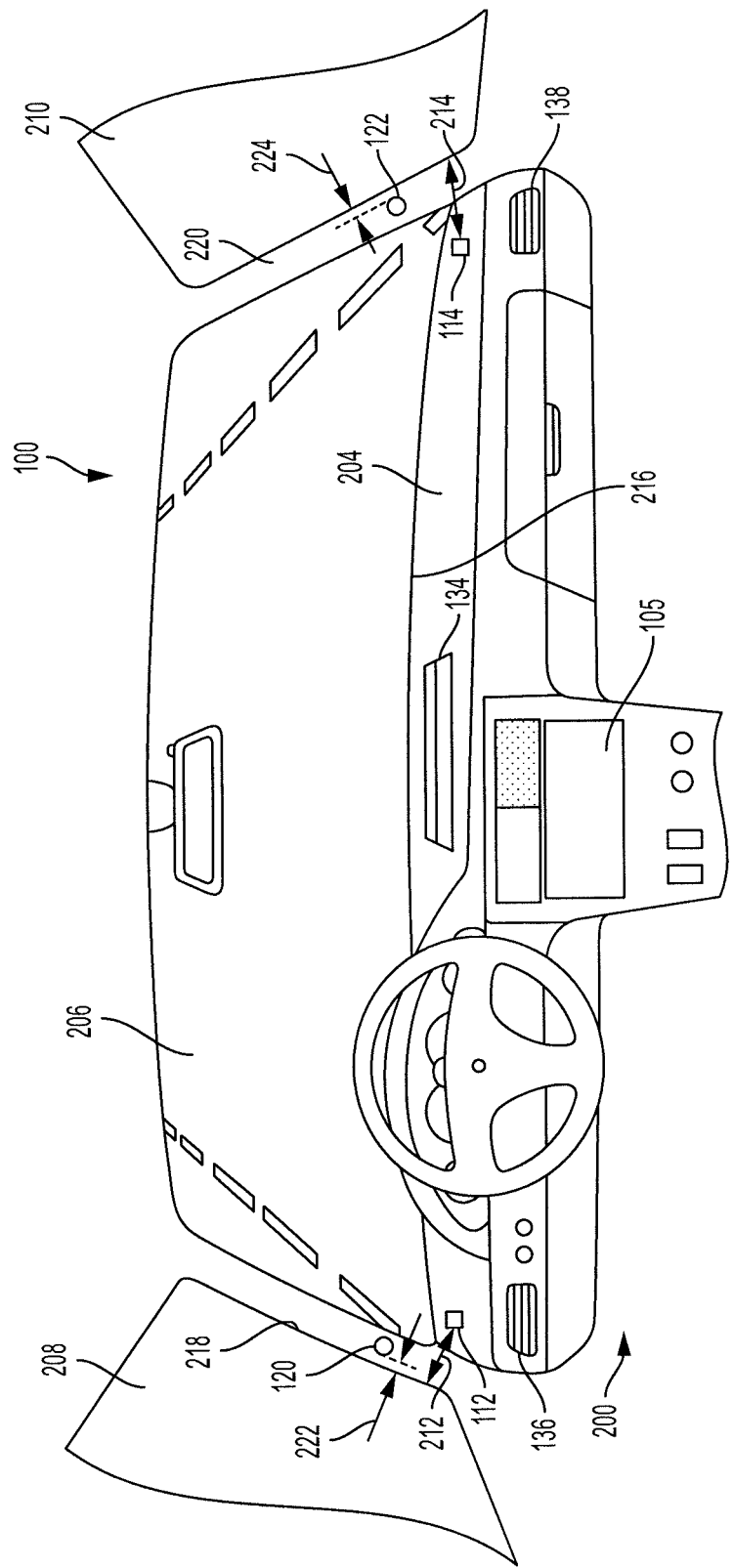
FIG. 2 is a drawing of a driver's view from inside a cabin of the vehicle of FIG. 1 including exemplary locations of sensors of the vehicle and vents of the HVAC of the vehicle according to an embodiment of the present invention.

The HVAC 110 is designed to provide heat, air conditioning and ventilation to a cabin of the vehicle 100 (such as the cabin 200 of FIG. 2). The HVAC 110 can heat or cool air, can adjust the humidity of air using air conditioning and/or heating, and can circulate the air throughout the vehicle cabin including towards windows of the vehicle 100. The HVAC 110 includes a blower 126 that forces air through ducts 128, 130, 132 to vents 134, 136, 138. The vents 134, 136, 138 direct a flow of air from the blower 126 towards the windows of the vehicle 100. The HVAC 110 may also include an evaporator (not shown) that is usable to reduce the amount of humidity in the air. Thus, the HVAC can cause the air blown by the blower 126 to have any of a wide range of temperatures and to have a reduced amount of humidity.

The HVAC 110 also includes a recycled air port 142 and a fresh air port 144. The HVAC 110 can receive air from the cabin via the recycled air port 142 and can receive fresh air from outside of the vehicle 100 via the fresh air port 144. The HVAC 110 can then heat and/or air condition the air and force the air into the cabin via the blower 126, the ducts 128, 130, 132 and the vents 134, 136, 138.

Referring now to FIGS. 1 and 2, the first and second internal temperature sensors 112, 114 may include any thermometer or other sensor capable of detecting an inside air temperature of air inside of the cabin 200. The ECU 102 is coupled to the internal temperature sensors 112, 114 and can receive the detected inside air temperature from the internal temperature sensors 112, 114. The vehicle 100 may include any number of internal temperature sensors.

At least part of each of the internal temperature sensors 112, 114 is positioned inside of the cabin 200. For example, the internal temperature sensors 112, 114 may be positioned on, adjacent to or in a dashboard 204 of the vehicle 100. The first internal temperature sensor 112 may be positioned within a predetermined distance 212 of a driver side window 208 and the second internal temperature sensor 114 may be positioned within a predetermined distance 214 of a passenger side window 210. Each of the predetermined distances 212, 214 may be, for example, six (6) inches, 12 inches, 24 inches or the like.

The first internal temperature sensor 112 may detect temperature data corresponding to air in the vicinity of the driver side window 208 and the second internal temperature sensor 114 may detect temperature data corresponding to air in the vicinity of the passenger side window 210. Because the internal temperature sensors 112, 114 are positioned on or adjacent to the dashboard 204, they may also detect temperature data corresponding to air in the vicinity of a windshield 206 (e.g., a front windshield).

The first vent 134 may be positioned in (or adjacent to or below) the center of, and extend along a length of, the dashboard 204. The first vent 134 may direct a flow of air towards the windshield 206 for defrosting the windshield 206. Because air blown through the first vent 134 may be heated and/or air conditioned, the temperature of the flow of air from the first vent 134 may not accurately represent the inside air temperature. Thus, it is desirable for the internal temperature sensors 112, 114 to be positioned away from the path of the airflow from the first vent 134. Furthermore, a driver or passenger's breath is typically warmer than surrounding air due to body heat. Thus, it is further desirable for the internal temperature sensors 112, 114 to be positioned away from a path of a driver or passenger's breath.

The vehicle 100 may have a longitudinal axis A-A'. In some embodiments, the internal temperature sensors 112, 114 may be positioned axially between the first vent 134 and a lower edge 216 of the windshield 206. Due to the proximity of the internal temperature sensors 112, 114 to the driver side window 208 and the passenger side window 210, as well as their axial position, the internal temperature sensors 112, 114 may be away from the path of the airflow from the first vent 134 and the airflow from a driver or passenger's breath.

The external temperature sensors 116, 118 may each include any thermometer or other sensor capable of detecting an ambient air temperature of air outside of the cabin 200. In that regard, at least part of each of the external temperature sensors 116, 118 may be positioned outside of the cabin 200. The ECU 102 is coupled to the external temperature sensors 116, 118 and can receive the detected ambient air temperature from the external temperature sensors 116, 118. The vehicle 100 may include any number of external temperature sensors.

The internal moisture sensors 120, 122 may include any sensor capable of detecting an amount of moisture in the air inside of the cabin 200. The ECU 102 is coupled to the internal moisture sensors 120, 122 and can receive the detected inside moisture level of the air inside of the cabin 200 from the internal moisture sensors 120, 122. The vehicle 100 may include any number of internal moisture sensors.

The internal moisture sensors 120, 122 are positioned inside of the cabin 200. The first internal moisture sensor 120 may be positioned on, adjacent to or in a strut 218 or other structure that separates the windshield 206 from the driver side window 208. The first internal moisture sensor 120 may be positioned within a predetermined distance 222 of the driver side window 208. The second internal moisture sensor 122 may be positioned on, adjacent to or in a strut 220 or other structure that separates the windshield 206 from the passenger side window 210. The second internal moisture sensor 122 may be positioned within a predetermined distance 224 of the passenger side window 210. The predetermined distances 222, 224 may be, for example, 6 inches, 12 inches, 24 inches or the like.

The first internal moisture sensor 120 may detect moisture data corresponding to air in the vicinity of the driver side window 208 and the second internal moisture sensor 122 may detect moisture data corresponding to air in the vicinity of the passenger side window 210. The internal moisture sensors 120, 122 may also detect moisture data corresponding to air in the vicinity of the windshield 206 due to their close proximity to the windshield 206.

The second vent 136 is positioned on or within the driver's side of the cabin 200 and the third vent 138 is positioned on or within the passenger's side of the cabin 200. The second vent 136 is oriented to direct air from the HVAC 110 towards the driver side window 208 and the third vent 138 is oriented to direct air from the HVAC 110 towards the passenger side window 210.

The air blown through the first vent 134, the second vent 136 and the third vent 138 may be air conditioned and thus may not accurately represent the moisture level in the cabin 200. Furthermore, human breath typically has more moisture than ambient air. Thus, it is desirable for the internal moisture sensors 120, 122 to be positioned away from the path of the airflow from the first vent 134, the second vent 136 and the third vent 138. It is further desirable for the internal moisture sensors 120, 122 to be positioned away from a path of a driver or passenger's breath.

The location of the internal moisture sensors 120, 122 on or adjacent to the struts 218, 220 places them away from the flow of air from the first vent 134, the second vent 136 and the third vent 138. Furthermore, they are away from the flow of breath from the driver and passenger when the driver and passenger are facing forward.

The external moisture sensor 124 may include any sensor capable of detecting an amount of moisture in the air outside of the cabin 200. In that regard, at least part of the external moisture sensor 124 may be positioned outside of the cabin 200. The ECU 102 is coupled to the external moisture sensor 124 and can receive the detected ambient moisture level from the external moisture sensor 124. The vehicle 100 may include any number of external moisture sensors.

The ECU 102 is coupled to the memory 104, the input device 105, the network access device 106, the GPS unit 108, the HVAC 110 and each of the sensors. The ECU 102 may receive data from the memory 104, the input device 105, the network access device 106, the GPS unit 108 and the sensors and control the operations of the HVAC 110 based on the received data. In particular, the ECU 102 can determine whether condensation is likely to form on the windshield 206, the driver side window 208 and/or the passenger side window 210 based on the received data.

Figure 3:
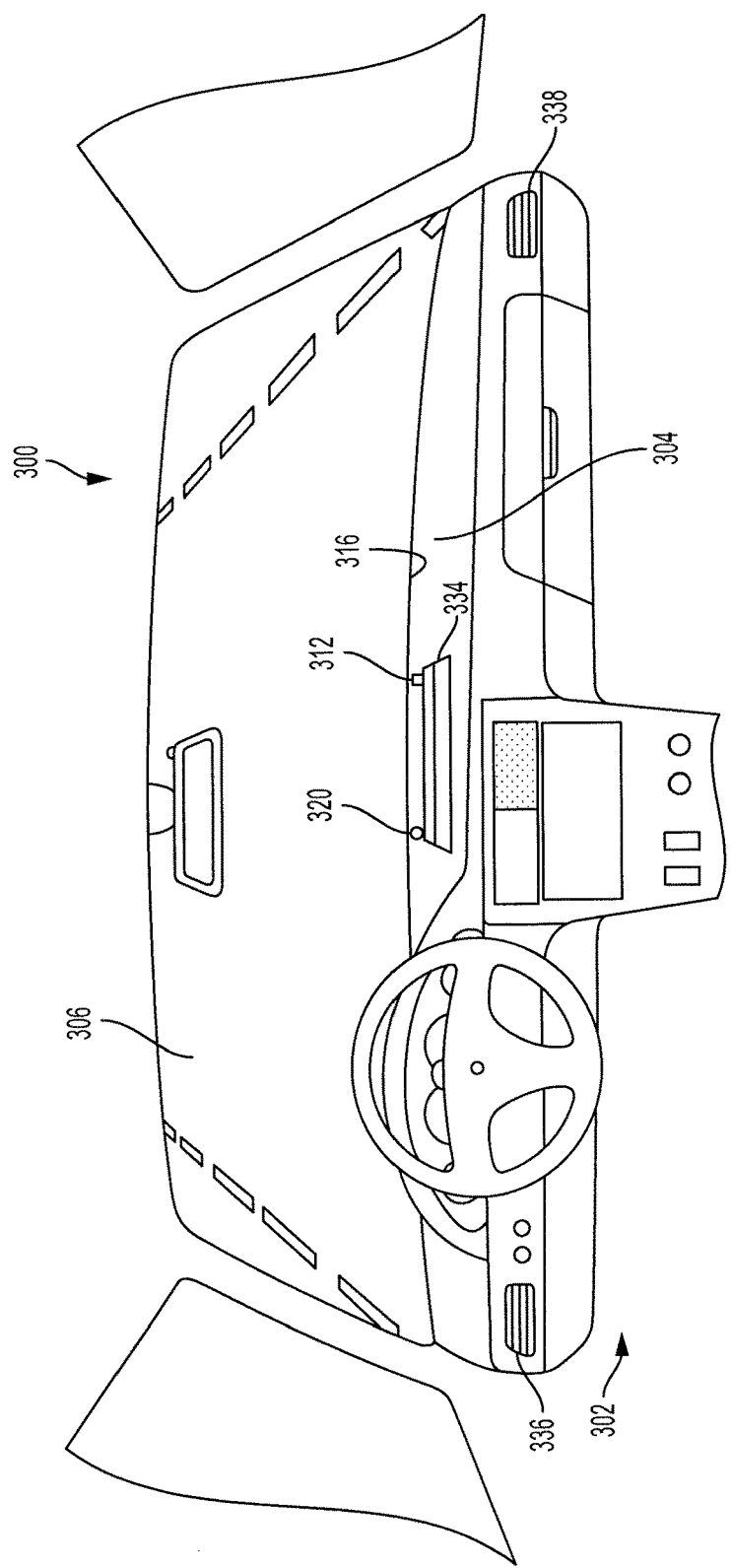
FIG. 3 is a drawing of a driver's view from inside a cabin of a vehicle including exemplary locations of sensors of the vehicle and vents of an HVAC of the vehicle according to an embodiment of the present invention.

Turning to FIG. 3, alternate positioning of internal sensors of a vehicle 300 is shown. In particular, the vehicle 300 includes an internal temperature sensor 312 and an internal moisture sensor 320. Both of the internal temperature sensor 312 and the internal moisture sensor 320 are positioned on or adjacent to a dashboard 304 of a cabin 302 of the vehicle 300. In particular, the internal temperature sensor 312 and the internal moisture sensor 320 are centrally positioned with respect to the dashboard 304. The internal temperature sensor 312 and the internal moisture sensor 320 are also positioned axially between a first vent 334 and a bottom edge 316 of a windshield 306.

In some embodiments the internal temperature sensor 312 and the internal moisture sensor 320 may be positioned on, adjacent to and/or coupled to the windshield 310 at a location proximal to the bottom edge 316 of the windshield 310. For example, any part of the internal temperature sensor 312 and/or the internal moisture sensor 320 may be coupled to the windshield and have at least a portion within 1 inch, or within 3 inches, or within 5 inches of the bottom edge 316.

Because of their central position with respect to the dashboard 304, the internal temperature sensor 312 and the internal moisture sensor 320 are away from a flow of a driver and a passenger's breath when the driver and passenger are facing forward. The central position further places the internal temperature sensor 312 and the internal moisture sensor 320 away from a flow of air from a second vent 336 and a third vent 338.

The axial positioning of the internal temperature sensor 312 and the internal moisture sensor 320 places it in a location away from the flow of air from the first vent 334. When air flows from the first vent 334, it will flow above the internal temperature sensor 312 and the internal moisture sensor 320 and, thus, minimally affect the detected inside air temperature and the detected inside moisture level of the air.

Figure 4:
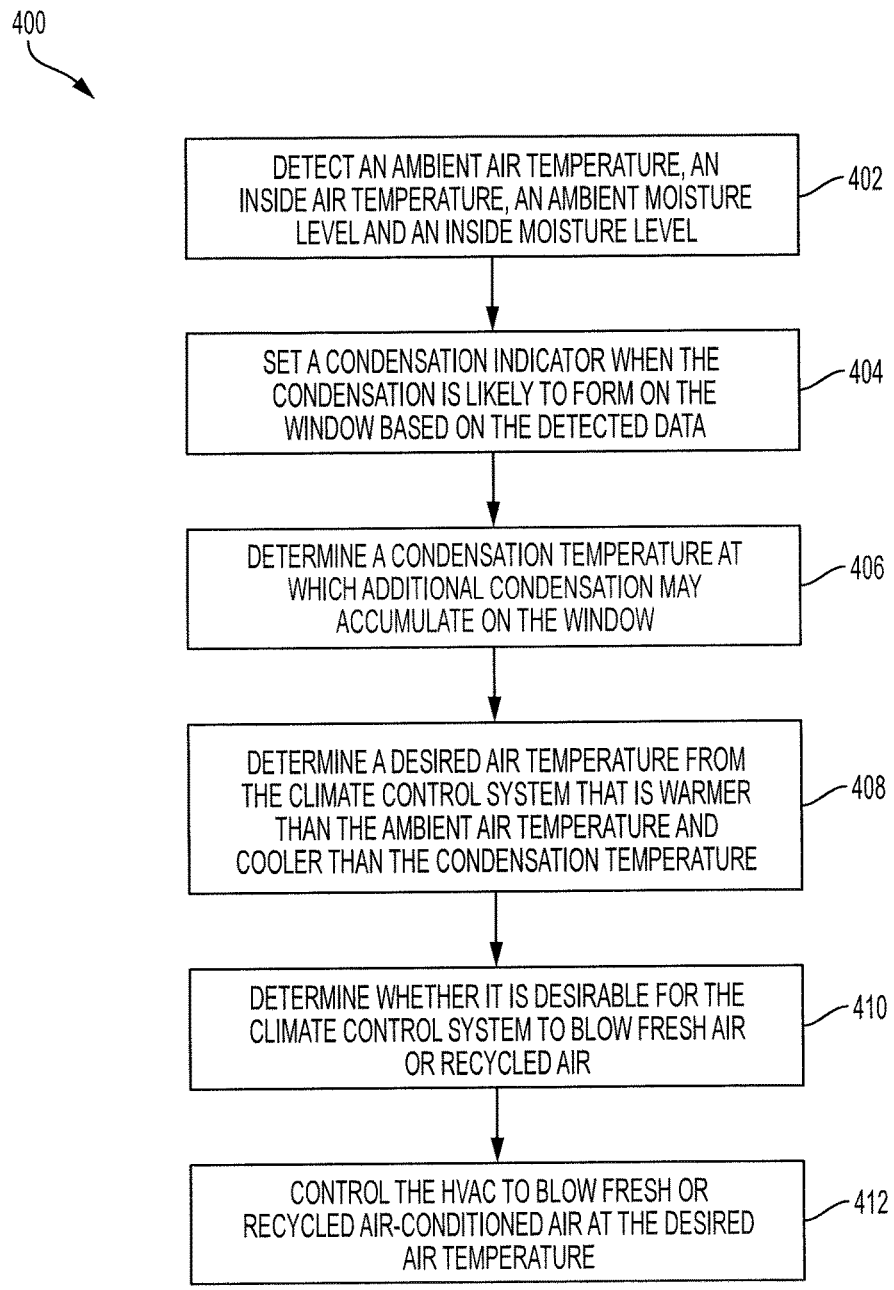
FIG. 4 is a flowchart illustrating a method for detecting conditions likely to cause condensation to accumulate on a vehicle's windows, determining optimal settings of an HVAC for reducing the condensation and controlling the HVAC to operate at the optimal settings according to an embodiment of the present invention.

Turning now to FIG. 4, a method 400 for automatic defrosting of a window of a vehicle is shown. The method 400 may be performed by components of a vehicle such as the vehicle 100 of FIG. 1. In some embodiments, the method 400 may be performed when a selection is made by a driver, via an input device, for the automatic defrost function to be on.

The method 400 may begin at block 402 where sensors detect temperature data and moisture data. In particular, one or more external temperature sensors may detect an ambient air temperature of air outside of the vehicle. One or more internal temperature sensors may detect an inside air temperature of air in the cabin of the vehicle. One or more internal moisture sensors may detect an inside moisture level of the air in the cabin of the vehicle. Optionally, one or more external moisture sensors may detect an ambient moisture level of the air outside of the vehicle.

If more than one of any type of sensor is used, the method 400 or some steps thereof may be repeated for each detected value. In some embodiments, the method 400 or steps thereof may be performed once based on an average of each of the ambient air temperature, the inside air temperature, the inside moisture level and the ambient moisture level.

In block 404, the ECU may set a condensation indicator when the condensation is likely to form on the window. The determination of whether to set the condensation indicator is based on the data detected in block 402.

Figure 5:
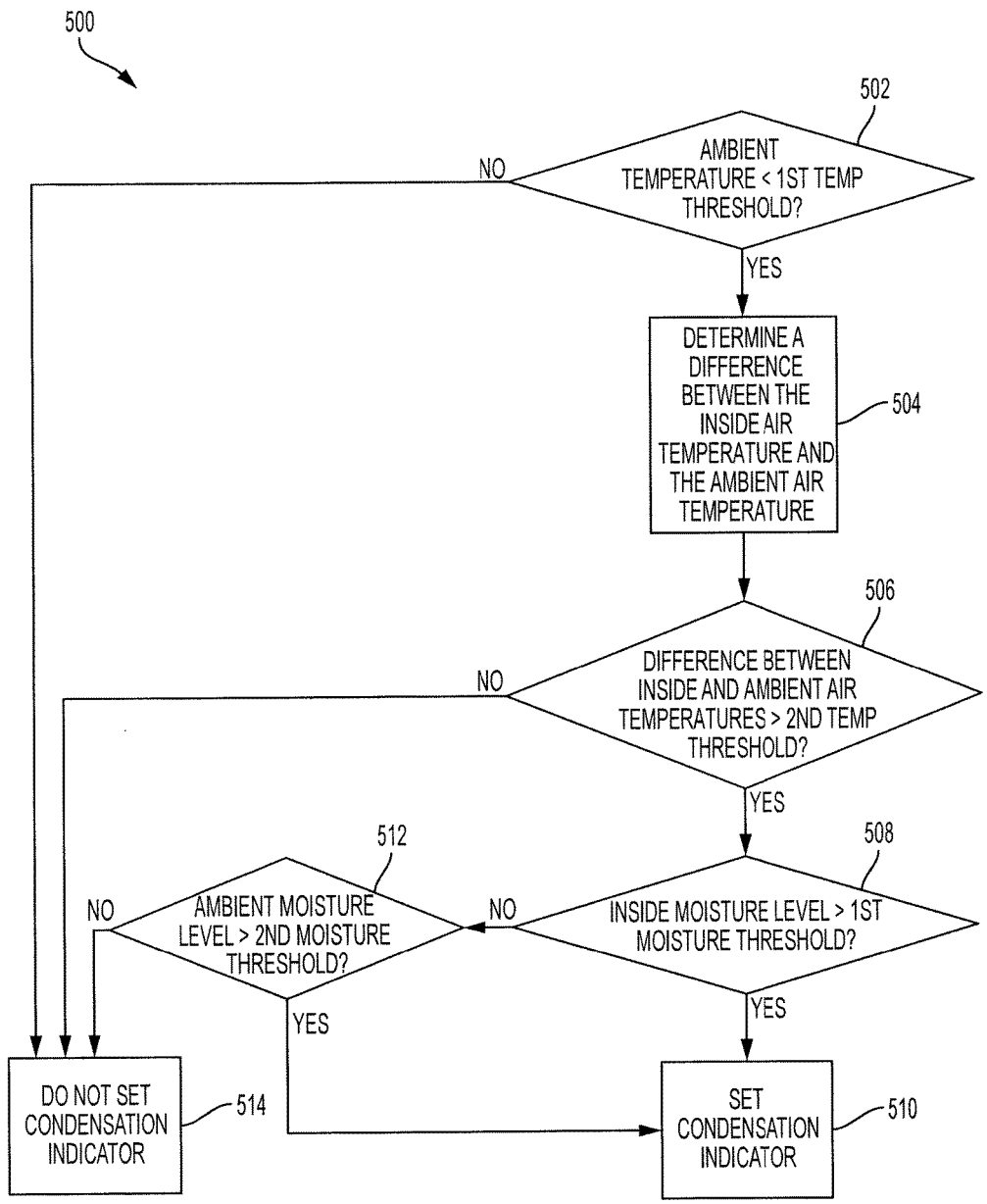
FIG. 5 is a flow diagram illustrating steps of a method for determining whether condensation is likely to accumulate on a vehicle's window based on data detected from various sensors according to an embodiment of the present invention.

Turning now to FIG. 5, a method 500 for determining whether to set a condensation indicator is shown. The method 500 may be performed in place of block 404 of FIG. 4.

In block 502, the ECU determines whether the ambient temperature is less than a first temperature threshold. The first temperature threshold is a threshold that is either programmed into the ECU or determined by the ECU and represents an ambient temperature value above which condensation is unlikely to occur. Stated differently, condensation may occur on an interior surface of a vehicle window when the ambient air temperature is less than the first temperature threshold but is unlikely to occur when the ambient air temperature is greater than the first temperature threshold, regardless of other factors.

A vehicle manufacturer may set the first temperature threshold to be between 60 degrees Fahrenheit (60 degrees F.) and 85 degrees F., or between 70 degrees F. and 85 degrees F., or about 70 degrees F. Where used herein, the term "about" refers to the referenced value plus or minus 10 percent of the referenced value. For example, the first temperature threshold may be 70 degrees F. or about 70 degrees F. If the ambient air temperature is 80 degrees F., condensation on an internal surface of a vehicle window is unlikely to form or occur.

In order to reduce or remove condensation from an interior surface of a window, air blown into the vehicle cabin should be heated to a temperature above the ambient air temperature. Another reason for setting the first temperature threshold is that it may be undesirable to further heat the vehicle cabin when the ambient temperature is above the first temperature threshold. Any air temperature above the first temperature threshold may be uncomfortable for a driver or a passenger.

Thus, the first predetermined temperature may be set by the vehicle manufacturer based on a desire for all condensation to be avoided and for the vehicle cabin to remain at a comfortable temperature. If the ambient temperature is greater than or equal to the first temperature threshold, the method proceeds to block 514 where the condensation indicator is not set.

In block 504, the ECU may determine a difference between the inside air temperature and the ambient air temperature. For example, the ECU may subtract the ambient air temperature from the inside air temperature to determine the difference.

In block 506, the ECU determines whether the difference between the inside air temperature and the ambient air temperature is greater than a second temperature threshold. The second temperature threshold may be programmed into the ECU or may be determined by the ECU. The second temperature threshold is a temperature differential below which condensation is unlikely to occur. Stated differently, condensation may occur when the temperature differential between the inside air temperature and the ambient air temperature is greater than the second temperature threshold, yet condensation is unlikely to occur when the temperature differential between the inside air temperature and the ambient air temperature is less than the second temperature threshold, regardless of any other factors.

A vehicle manufacturer may set the second temperature threshold to be between 5 degrees F. and 20 degrees F., or between 5 degrees F. and 15 degrees F., or about 10 degrees F. For example, the second temperature threshold may be 10 degrees F. If the differential between the inside air temperature and the ambient air temperature is 5 degrees F., condensation on an internal surface of a vehicle window is unlikely to form.

Condensation forms when warm, moist air contacts a cooler surface. The air near the cooler surface cools off and cannot hold as much moisture as when it was warm. The moisture from the air then converts from gas to liquid and collects on the cool surface. Thus, condensation may be unlikely when the internal air temperature and the ambient air temperature are closer in value than the second temperature threshold because the window may not sufficiently cool the warm, moist air for gaseous moisture to convert to liquid. Thus, if the difference between the inside air temperature and the ambient air temperature is less than or equal to the second threshold value, the method 500 proceeds to block 514 where the condensation indicator is not set.

In some embodiments, the ECU determines whether the ambient air temperature is greater than the inside air temperature. In some embodiments, if the ambient air temperature is greater than the inside air temperature, the method 500 may also proceed to block 514 where the condensation indicator is not set. This is because any condensation that occurs when the ambient air temperature is greater than the inside air temperature will form on the outside of the vehicle window and can be cleared by rolling down the windows and/or using the wipers to clear the windshield. However, it may also be desirable to reduce external condensation without rolling down the windows or using the wipers. Thus, in some embodiments, the method 400 may proceed to block 508 if the ambient air temperature is greater than the inside air temperature and the difference is greater than the second temperature threshold.

In block 508, the ECU determines whether the inside moisture level is greater than a first moisture threshold. The first moisture threshold is a threshold that is either programmed into the ECU or determined by the ECU and represents an inside moisture value above which condensation may occur. Stated differently, condensation is unlikely to occur when the inside moisture level is less than the first moisture threshold. For example, the first moisture threshold may be 25 percent (25%). If the inside moisture level is 10%, condensation may be unlikely to occur.

Condensation will only occur when moisture is present in the air. As described above, condensation occurs when the moist air contacts the cooler surface. Thus, if all above conditions have been met and the inside moisture level is greater than the first moisture threshold, condensation on the inside of the vehicle's window may be likely. When the ECU determines that the inside moisture level is greater than the first moisture threshold, the method 500 may proceed to block 510 where the condensation indicator is set.

Condensation is more likely to occur in some regions than other regions. For example, condensation is more likely to occur in relatively dry and cold locations such as Michigan during the winter months. This is because moisture from a human body will evaporate faster in dry air, increasing the humidity within the cabin of the vehicle. If the vehicle is parked outside in a relatively cool location, the evaporated moisture from the human body will contact the relatively cool window and condense. Condensation is less likely to occur in relatively humid and warm locations such as Florida during the summer. This is because the moisture from the human body will not evaporate at as rapid of a rate as in cool and dry locations. Thus, the first moisture threshold may be set based on a location of the vehicle and/or a time of the year.

In some embodiments, the ECU may determine the current location of the vehicle based on data detected by the GPS. The memory may include a database that includes the moisture thresholds and the corresponding locations. Thus, the ECU can determine the moisture threshold by comparing the detected location data with the database in the memory. In some embodiments, the ECU may transmit, via the network access device, the current location to the cloud and receive the corresponding moisture threshold from the cloud.

In some embodiments, the moisture threshold may be set for the vehicle based on the intended destination of the vehicle. For example, a vehicle may be manufactured to be sold in Alaska. The vehicle manufacturer may set the moisture threshold based on conditions in Alaska.

The memory may also or instead include a database that includes the moisture thresholds and corresponding times of year. The ECU may determine the current time of year and lookup the moisture threshold in the database based on the current time of year.

As mentioned above, it may also be desirable to remove condensation on an outside surface of the vehicle window. In that regard, ECU may also determine whether the ambient moisture level is greater than a second moisture threshold in block 512. The second moisture threshold is a threshold that is either programmed into the ECU or determined by the ECU and represents an ambient moisture value above which condensation may occur. Stated differently, condensation is unlikely to occur when the ambient moisture level is less than the first moisture threshold. For example, the second moisture threshold may be 25%. If the ambient moisture is 10%, condensation may be unlikely to occur.

If the above conditions are met and the ambient moisture level is greater than the second moisture threshold, condensation on the external surface of the vehicle's window may be likely. Thus, the method 500 may proceed to block 510 where the ECU sets the condensation indicator.

Returning to FIG. 4 and after the condensation indicator has been set, the ECU may determine a condensation temperature corresponding to a temperature of air blown by the HVAC at which additional condensation may accumulate on the window in block 406. The condensation temperature is typically greater than the ambient air temperature. Additional condensation is likely to occur when the HVAC blows air at the condensation temperature because more condensation occurs when the difference between the inside air temperature and the ambient air temperature is greater.

The ECU may determine the condensation temperature based on at least one of the inside air temperature, the ambient air temperature, the inside moisture level and/or the ambient moisture level.

In block 408, the ECU may determine a desired air temperature corresponding to a desired temperature of air blown by the HVAC. The desired air temperature may be warmer than the ambient air temperature and cooler than the condensation temperature. The desired air temperature may be determined based on at least one of the inside air temperature, the ambient air temperature, the inside moisture level and/or the ambient moisture level.

As described above, condensation typically occurs when the ambient temperature is relatively cool. Thus, it is undesirable for the air blown into the cabin of the vehicle to be cooler than the ambient temperature as cooler air may cause discomfort to the driver. Furthermore, air will be blown by the HVAC at the desired air temperature in order to reduce condensation on the vehicle window. Thus, it is undesirable for the air from the HVAC to be warmer than the condensation temperature.

In some embodiments, the desired air temperature may be set to a predetermined value less than the condensation temperature, such as 5 degrees F., 10 degrees F. or the like. For example, if the predetermined value is 5 degrees F. and the condensation temperature is 50 degrees F., the desired air temperature may be set to 55 degrees F. In some embodiments, the desired air temperature may be set to be an average of the ambient air temperature and the condensation temperature. In some embodiments, any other method may be used to determine the desired air temperature.

Before the HVAC blows the air, the ECU may determine whether it is preferable to blow fresh air or recycled air in block 410. Because the condensation originates from moisture in the air, it is desirable to provide air having the least amount of moisture in it. Thus, the ECU may compare the inside moisture level to the ambient moisture level. If the inside moisture level is greater than the ambient moisture level, the ECU may determine that fresh air is desirable because it has less moisture than the recycled air. If the inside moisture level is less than the ambient moisture level, the ECU may determine that recycled air is desirable because it has less moisture than the fresh air.

In block 412, the ECU may automatically control the HVAC to blow air at the desired air temperature. The ECU may also automatically control the HVAC to blow fresh air or recycled air based on the determination in block 410. Block 410 may be optional. When block 410 is optional, the HVAC may be designed to blow fresh air.

The ECU also controls the HVAC to air condition the air prior to blowing it onto the window or windshield. Air conditioning removes moisture from air, thus reducing the unnecessary amount of condensation that can accumulate. However, if moisture level of the air is below a comfort threshold, the dry air may cause discomfort to the driver and passengers. In order to reduce the likelihood of this discomfort, the ECU may monitor the inside moisture level so that it remains above the comfort threshold.

Referring now to FIG. 6, a table 600 shows exemplary control of an HVAC by an ECU based on detected data, such as control of the HVAC 110 by the ECU 102 of FIG. 1. The ECU may control the HVAC based on a method similar to the method 400 of FIG. 4. The moisture threshold, the first temperature threshold and the second temperature threshold are shown in a legend 602.

In row 604, the ambient air temperature is 70 degrees F. However, the first temperature threshold is 65 degrees F. Thus, the ambient air temperature is not less than the first temperature threshold and the condensation indicator will not be set.

In row 606, the ambient air temperature is 50 degrees F. which is less than the first temperature threshold. However, the difference between the inside air temperature and the ambient air temperature is only 5 degrees F. Thus, the difference is less than the second temperature threshold of 10 degrees F. and the condensation indicator will not be set.

In row 608, the ambient air temperature is 50 degrees F., also below the first temperature threshold. The difference between the inside air temperature and the ambient air temperature is 15 degrees F. which is greater than the second temperature threshold. Furthermore, the inside moisture level is 40%, which is greater than the moisture threshold. This combination of data indicates that condensation may occur and, thus, the condensation indicator is set.

The ECU has determined that the desired temperature is 60 degrees F., which is greater than the ambient air temperature yet not sufficiently high to cause additional condensation to form on the window. The desired temperature is cooler than the inside air temperature which may occasionally occur when the condensation temperature is close in value to the inside air temperature.

The inside moisture level is 40% which is greater than the ambient moisture level of 35%. Thus, the ECU may determine that the HVAC should blow fresh air instead of recycled air as the fresh air has less moisture than the air inside of the vehicle cabin. The ECU may then control the HVAC to blow air conditioned recycled air at 60 degrees F.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing condensation of an internal surface of a window of a vehicle comprising:
    an external temperature sensor configured to detect an ambient air temperature of an environment of the vehicle;
    an internal temperature sensor configured to detect an inside air temperature of a cabin of the vehicle;

an internal moisture sensor configured to detect an inside moisture level of the air inside of the cabin of the vehicle;
a heating, ventilation and air conditioning system (HVAC) configured to blow air into the cabin of the vehicle at a desired temperature;
an electronic control unit (ECU) coupled to the external temperature sensor, the internal temperature sensor, the internal moisture sensor and the HVAC and configured to:
  determine a difference between the inside air temperature and the ambient air temperature,
  set a condensation indicator when the ambient air temperature is less than a first temperature threshold, the difference between the inside air temperature and the ambient air temperature is greater than a second temperature threshold, and the inside moisture level is greater than a moisture threshold,
  determine a condensation temperature corresponding to a potential temperature of air from the HVAC at which additional condensation will accumulate on the window based on the inside air temperature and the ambient air temperature,
  determine the desired temperature for the air blown by the HVAC that is warmer than the ambient air temperature and cooler than the condensation temperature based on the inside air temperature and the ambient air temperature, and
  control the HVAC to blow air at the desired temperature when the condensation indicator is set.

2. The system of claim 1 further comprising an external moisture sensor configured to detect an ambient moisture level of the air of the environment of the vehicle, wherein the ECU is further configured to set the condensation indicator when the ambient air temperature is less than the first temperature threshold, the difference between the inside air temperature and the ambient air temperature is greater than a third temperature threshold, and the ambient moisture level is greater than a second moisture threshold.

3. The system of claim 1 further comprising an external moisture sensor configured to detect an ambient moisture level of the air of the environment of the vehicle, wherein the ECU is further configured to:
  cause the air blown by the HVAC to be recycled air when the condensation indicator is set and the ambient moisture level is greater than the inside moisture level, and
  cause the air blown by the HVAC to be fresh air when the condensation indicator is set and the ambient moisture level is less than the inside moisture level.

4. The system of claim 1 wherein the ECU is further configured to determine the condensation temperature based on the inside moisture level.

5. The system of claim 1 further comprising a GPS unit configured to detect a current location of the vehicle and wherein the ECU is further configured to set the moisture threshold based on the current location of the vehicle.

6. The system of claim 1 wherein the moisture threshold is set based on a region in which the vehicle is sold.

7. The system of claim 1 wherein the ECU is further configured to determine a current time of year and to set the moisture threshold based on the current time of year.

8. The system of claim 1 wherein:
the window is a windshield of the vehicle and has a lower edge,
the HVAC has a vent through which the HVAC is configured to blow the air such that the air is blown towards the windshield,
the vehicle has a longitudinal axis, and
the internal temperature sensor is positioned axially between the lower edge of the windshield and the vent at a location that is not in a direct flow path of the air blown through the vent.

9. The system of claim 1 wherein:
the vehicle further includes a driver side window and a passenger side window,
the window is a windshield of the vehicle, and
the internal temperature sensor includes a first internal temperature sensor configured to detect a first inside air temperature corresponding to air within a predetermined distance of the driver side window and a second internal temperature sensor configured to detect a second inside air temperature corresponding to air within a predetermined distance of the passenger side window.

10. The system of claim 1 wherein:
the window is a windshield of the vehicle and has a lower edge,
the HVAC has a vent through which the HVAC is configured to blow the air such that the air is blown towards the windshield,
the vehicle has a longitudinal axis, and
the internal moisture sensor is positioned axially between the lower edge of the windshield and the vent at a location that is not in a direct flow path of the air blown through from the vent.

11. The system of claim 1 wherein the internal moisture sensor includes at least two moisture sensors each configured to detect a moisture level and wherein the inside moisture level is an average of the moisture level detected by each of the at least two moisture sensors.

12. The system of claim 1 wherein the HVAC is further configured to air condition the air to a desired humidity and wherein the ECU is further configured to control the HVAC to blow air at the desired humidity when the condensation indicator is set.

13. A method for reducing condensation of an internal surface of a window of a vehicle comprising:
  detecting, using an external temperature sensor, an ambient air temperature of an environment of the vehicle;
  detecting, using an internal temperature sensor, an inside air temperature of a cabin of the vehicle;
  detecting, using an internal moisture sensor, an inside moisture level of the air inside of the cabin of the vehicle;
  determining, by an electronic control unit (ECU), a difference between the inside air temperature and the ambient air temperature;
  setting, by the ECU, a condensation indicator when the ambient air temperature is less than a first temperature threshold, the difference between the inside air temperature and the ambient air temperature is greater than a second temperature threshold, and the inside moisture level is greater than a moisture threshold;
  determining, by the ECU, a condensation temperature corresponding to a potential temperature of air blown by a heating, ventilation and air conditioning system (HVAC) of the vehicle at which additional condensation will accumulate on the window based on the inside air temperature and the ambient air temperature;
  determining, by the ECU, a desired temperature of air for the HVAC to blow that is warmer than the ambient air temperature and cooler than the condensation temperature based on the inside air temperature and the ambient air temperature; and controlling, by the ECU, the HVAC to blow air at the desired temperature when the condensation indicator is set.

14. The method of claim 13 further comprising:
detecting, by an external moisture sensor, an ambient moisture level of the air of the environment of the vehicle; and
setting, by the ECU, the condensation indicator when the ambient air temperature is less than the first temperature threshold, the difference between the inside air temperature and the ambient air temperature is greater than a third temperature threshold, and the ambient moisture level is greater than a second moisture threshold.

15. The method of claim 13 further comprising:
detecting, by an external moisture sensor, an ambient moisture level of the air of the environment of the vehicle;
causing, by the ECU, the air blown by the HVAC to be recycled air when the condensation indicator is set and the ambient moisture level is greater than the inside moisture level; and
causing, by the ECU, the air blown by the HVAC to be fresh when the condensation indicator is set and the ambient moisture level is less than the inside moisture level.

16. The method of claim 13 further comprising:
detecting, by a GPS unit, a current location of the vehicle; and
determining, by the ECU, the moisture threshold based on the current location of the vehicle.

17. The method of claim 13 further comprising:
determining, by the ECU, a current date; and
determining, by the ECU, the moisture threshold based on the current date.

18. A system for reducing condensation of an internal surface of a windshield of a vehicle having a longitudinal axis, the system comprising:
a heating, ventilation and air conditioning system (HVAC) having a vent positioned on or adjacent to a dashboard of the vehicle and a blower configured to blow air through the vent into a cabin of the vehicle at a desired temperature;
an external temperature sensor configured to detect an ambient air temperature of an environment of the vehicle;
an internal temperature sensor positioned on or adjacent to the dashboard between a lower edge of the windshield and the vent and configured to detect an inside air temperature of the cabin of the vehicle;
an internal moisture sensor positioned on or adjacent to the dashboard and configured to detect an inside moisture level of the air inside of the cabin of the vehicle;
an external moisture sensor configured to detect an ambient moisture level of the air of the environment of the vehicle; and
an electronic control unit (ECU) coupled to the external temperature sensor, the internal temperature sensor, the internal moisture sensor and the HVAC and configured to:
determine a difference between the inside air temperature and the ambient air temperature,
set a condensation indicator when the ambient air temperature is less than a first temperature threshold, the difference between the inside air temperature and the ambient air temperature is greater than a second temperature threshold, and at least one of the inside moisture level is greater than a first moisture threshold or the ambient moisture level is greater than a second moisture threshold,
determine a condensation temperature corresponding to a potential temperature of air from the HVAC at which additional condensation will accumulate on the windshield based on the inside air temperature and the ambient air temperature,
determine the desired temperature for the air blown by the HVAC that is warmer than the ambient air temperature and cooler than the condensation temperature based on the inside air temperature and the ambient air temperature,
determine that the air blown by the HVAC should be recycled air when the ambient moisture level is greater than the inside moisture level and fresh air when the ambient moisture level is less than the inside moisture level, and
control the HVAC to blow air at the desired temperature when the condensation indicator is set.

19. The system of claim 18 wherein the internal moisture sensor is positioned on the dashboard between the lower edge of the windshield and the vent and wherein the internal moisture sensor and the internal temperature sensor are each positioned at a location that is not in a direct flow path of the air blown through the vent.

20. The system of claim 18 wherein the internal moisture sensor includes at least two moisture sensors each configured to detect a moisture level and wherein the inside moisture level is an average of the moisture level detected by each of the at least two moisture sensors.

* * * * *